United States Patent
Watanabe (10) Patent No.: US 8,634,098 B2
(45) Date of Patent: Jan. 21, 2014

(54) IMAGE PROCESSING SYSTEM AND IMAGE PROCESSING APPARATUS AND METHOD

(71) Applicant: Canon Kabushiki Kaisha, Tokyo (JP)

(72) Inventor: Akira Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/688,052

(22) Filed: Nov. 28, 2012

(65) Prior Publication Data

US 2013/0088752 A1    Apr. 11, 2013

Related U.S. Application Data

(62) Division of application No. 12/719,701, filed on Mar. 8, 2010.

(30) Foreign Application Priority Data

Mar. 12, 2009    (JP) ................... 2009-059560

(51) Int. Cl.
 *G06F 15/00*    (2006.01)
(52) U.S. Cl.
 USPC ........................................ 358/1.15

(58) Field of Classification Search
 USPC ........................................ 358/1.13
 See application file for complete search history.

(56) References Cited

U.S. PATENT DOCUMENTS

2004/0229602 A1    11/2004    Brown
2009/0284807 A1*   11/2009    Niculescu .................... 358/474

FOREIGN PATENT DOCUMENTS

JP    2006-325147 A    11/2006

* cited by examiner

*Primary Examiner* — Saeid Ebrahimi Dehkordy (74) *Attorney, Agent, or Firm* — Canon USA Inc. IP Division (57) ABSTRACT

A scanner that provides WSD standard scan service does not allow the notification and identification by a client PC of scan parameters, such as a resolution and a reading range, that are selected by a user in push scan on a panel, for example, attached to the scanner body. This prevents the push scan with the user-specified scan parameters. Accordingly, an event that temporarily limits the scanning functions is issued to inhibit the specification of parameters excluding user-specified scan parameters from a client PC. Thus, the client PC can instruct the scanning with the user-specified parameters, and the push scan requested by the user can be implemented. The limitation is valid only to the destination client of the push scan.

15 Claims, 9 Drawing Sheets

IMAGE PROCESSING SYSTEM AND IMAGE PROCESSING APPARATUS AND METHOD

CROSS-REFERENCE TO RELATED APPLICATIONS

This application is a divisional of application Ser. No. 12/719,701, filed on Mar. 8, 2010, which claims the benefit of Japanese Patent Application No. 2009-059560 filed Mar. 12, 2009, which are hereby incorporated by reference herein in their entirety.

BACKGROUND OF THE INVENTION

1. Field of the Invention

The present invention relates to an image processing system with a push-scan function, and an image processing apparatus and an image processing method.

2. Description of the Related Art

In recent years, with the increase in networked appliances including household electrical appliances, there have been standardized communication protocols to be used between apparatuses over a network, apparatus discovery mechanisms, and apparatus installation mechanisms. This is also true for specifications of services including those provided by image processing apparatus such as printers (for printing) and scanners (for image reading). There have further been normalized standard communication protocols for using network equipment more universally from a client PC and the services for using devices more simply. They may include WSD (Web Services For Devices) and UPnP (Universal Plug & Play) (registered trademark).

WSD is a standard specification defined for meeting requests for various services using those devices. WSD basically uses a web service architecture and provides a standardized communication protocol set, printing services and scan services. WSD applies a standard communication protocol set over a network for allowing interconnection between devices based on a web service. WSD defines the components of a Web Services For Devices, including device discovery (DISCOVERY), device information presentation (DESCRIPTION), device control (CONTROL), and device event notification (EVENTING).

PnP-X (Plug And Play Extensions) service proposed by MICROSOFT for devices connected over a network may be used to easily install a device driver to a client PC supporting PnP-X.

PnP (plug and play) service in the past works when devices and a client PC are connected to various local I/O ports directly via cables and connectors. In PnP, a device transmits a model name (or device ID) or a manufacturer name (or vendor ID), a serial number and so on to a host PC. With reference to the received information device, the host PC may automatically install a device driver for using the device to the client.

Scan services are defined in Scan Service Definition Version 1.0 For WSD.

In this way, there have been provided interconnectivity services between a client PC using a scan service and a scanner that provides scanning with the scan service.

The WSD standard scan service defines commands and events for using the scan service in a language based on the format conforming to WSD. The WSD standard scan service further defines two scanning forms of pull scan and push scan.

In both of the forms, an image processing apparatus performs image processing (or scanning) in accordance with an event request command issued by a client PC. In pull scan, image processing (or scanning) is performed when a client PC issues an event request command. In push scan on the other hand, the transmission of an event start command for push scan instructed by a user with a button or the like on an image processing apparatus triggers the issuance of the event request command from a client PC, and the image processing (or scanning) is performed.

Japanese Patent Laid-Open No. 2005-38016 discloses a technology that enables a client PC to identify a service which can be provided by a device connected to a client PC. The data processing apparatus disclosed in Japanese Patent Laid-Open No. 2005-38016 includes an equipment information acquisition device that acquires the presence of devices such as a hard disk, a finisher and a duplex processor and detail information. In accordance with the acquired presence of devices and detail information, a WSDL file for the data processing apparatus is generated, and the generated WSDL file is transmitted to the information processing apparatus. In other words, the connection of devices and the services that can be provided by the devices are detected, and the information is transmitted to the client PC. This enables the client PC to identify the services provided by the devices.

Japanese Patent Laid-Open No. 2005-38016 discloses the technology that, in a scanner that provides WSD standard scan services, enables a client PC to identify changes in services that can be provided by optional devices such as an ADF unit and a film guide based on the connection states of the devices.

However, WSD scan services define that the value of a parameter being an individual set value for a service that can be provided by a scanner is to be specified on the client PC side. Thus, even when a user trying to implement push scan sets a scan parameter on a panel attached to the scanner, the scan parameter is not set on the client PC. As a result, the scan request command issued by the client PC does not reflect the scan parameter set by the user.

In other words, in push scan with the WSD protocol, it is difficult to use the parameter specified by a user on a control panel that is selected by the user, for scanning.

SUMMARY OF THE INVENTION

According to an aspect of the present invention, there is provided an image processing system including a plurality of information processing apparatus and an image processing apparatus, the image processing apparatus having a first transmitting unit which generates first information describing an ability that the image processing apparatus has and transmits the first information to the plurality of information processing apparatus, a second transmitting unit which generates second information describing a parameter selected by a user as an ability of the image processing apparatus and transmits the second information to the plurality of information processing apparatus, a request-command transmitting unit which receives an instruction to start image processing from a user through the image processing apparatus and requests a start command for an event that instructs to start the image processing to the plurality of information processing apparatus, and an image processing unit which performs image processing in accordance with the instruction to start the image processing received from the plurality of information processing apparatus, and the plurality of information processing apparatus having a holding unit which holds the first information received from the image processing apparatus, an updating unit which updates information saved in the holding unit in accordance with the second information received from the image processing apparatus, and a start-command transmitting unit which uses the second information to instruct an event to start the image processing to the image processing apparatus in accordance with the request command received from the image processing apparatus.

According to the aspect of the present invention, the configuration allows push scan with the scan parameters specified by a user on a panel of a scanner.

Further features of the present invention will become apparent from the following description of exemplary embodiments with reference to the attached drawings.

DESCRIPTION OF THE EMBODIMENTS

With reference to the attached drawings, there will be described embodiments of the present invention below. The descriptions on the following embodiments assume the use of a scanner as an example of an image processing apparatus. The present invention is particularly effective to a scanner or printer based on the WSD standard specifications or multifunctional peripherals integrally containing an image processing apparatus such as a scanner and a printer. In the following embodiments, the image processing apparatus is connected to a plurality of information processing apparatus (such as PCs equipped with Windows Vista as an OS) including WSD over a communication network and transmits and receives WSD commands to and from the information processing apparatus.

First Embodiment

Figure 9:
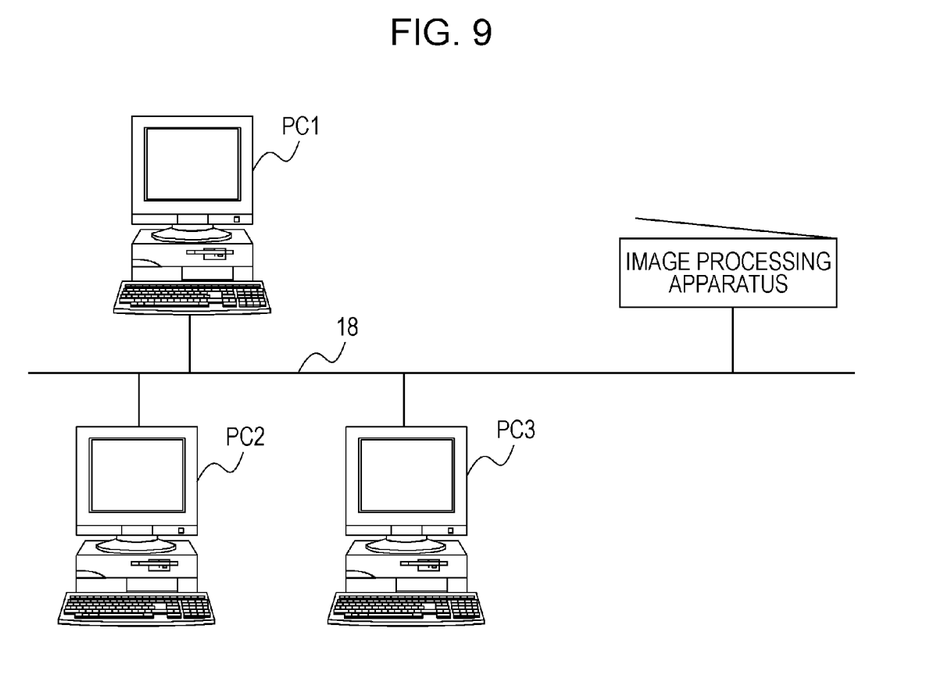
FIG. 9 is a system configuration diagram of an image processing system according to an embodiment of the invention.

FIG. 9 is a configuration diagram illustrating a system according to an embodiment of the present invention. A plurality of information processing apparatus (illustrated as PCs 1 to 3) and an image processing apparatus (such as a scanner) may be connected via an Ethernet (registered trademark) cable 18, for example. The image processing apparatus may be a stand-alone scanner or a multifunctional peripheral integrally containing printer and/or facsimile functions. In the configuration with a stand-alone scanner, the information processing apparatus is connected to an image output apparatus, not shown, such as a printer so that scanned images can be printed.

Figure 1:
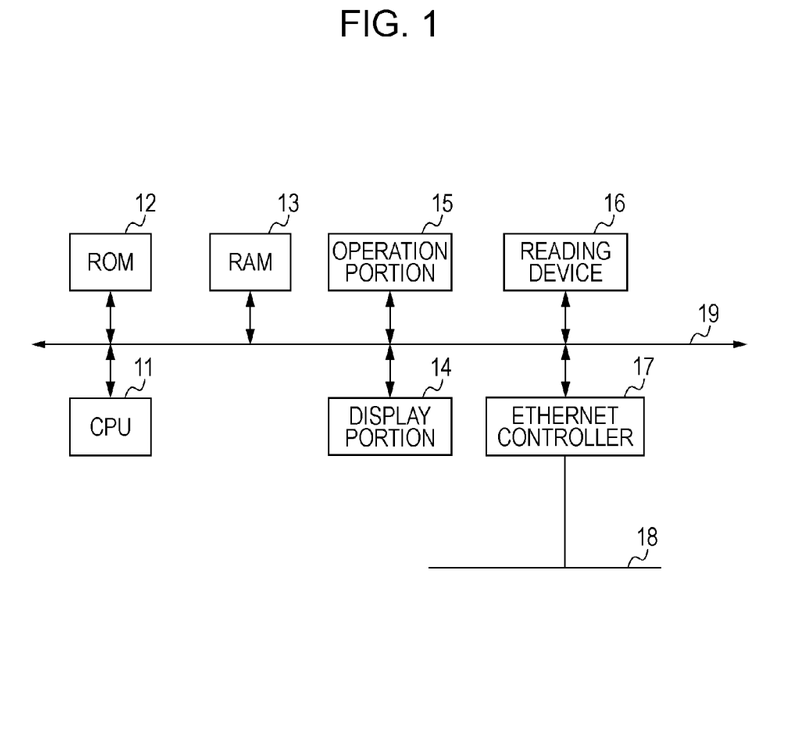
FIG. 1 is a schematic diagram of a hardware configuration of a scanner.

FIG. 1 illustrates a network scanner according to an embodiment of the present invention.

A CPU 11 controls over the apparatus in accordance with a program for basic control, for example, stored in a ROM 12. A RAM 13 may be used as a work area for executing a program read from the ROM 12, a buffer for data transmission and reception or a temporary buffer for image data generated in a reading device 16.

An Ethernet (registered trademark) controller 17 receives and transmits commands for executing scanning to and from a client PC over a wired LAN network connected through Ethernet (registered trademark) defined by IEEE 802.3. The scanner further transmits image data to a client P. The Ethernet (registered trademark) controller 17 includes a connector for an Ethernet (registered trademark) cable for supporting wired LAN communication and a controller responsible for interface control.

An Ethernet (registered trademark) cable 18 is connected to the connector for communication. A wireless LAN PC card and a wireless controller may be added thereto in order to use a wireless LAN network defined by IEEE 802.11 A/B/G. In order to support wireless LANs, the Ethernet (registered trademark) controller 17 may include a PC card interface for connecting a PC card for supporting wireless LAN communication.

According to an embodiment of the present invention, there is provided a scanner using, as a communication protocol, the WSD protocol that is a scan service. The communication protocol (or method) to be used in WSD and the request form and response form relating to scanning are defined in the standards.

The ROM 12 stores a program for causing the reading device 16 to scan in accordance with the communication using WSD protocol scan service (or WSD scan service) that is the standard protocol.

The reading device 16 reads a readable medium such as a document and a film mounted on a copy holder to generate image data. The reading device 16 has a scanner head having a reading width corresponding to a maximum width that can be read. By scanning the scanner head, image data is generated.

An operation portion 15 is operated by a user to issue various instructions to the scanner. The issuable instructions may include, for example, setting a scan parameter (such as a resolution, a reading range, and a detail of image processing) in causing the scanner to read a readable medium. Since the scan parameters depend on the specification of the scanner, detail parameters are settable if the scanner is capable of performing advanced image processing. Conversely, if the scanner is not internally capable of performing advanced image processing, a part of the image processing may be performed on a PC. In this case, a scan parameter required for image processing to be performed on a PC may only be set.

The destination (such as a PC and a printer connected over a network) of the read image data may be set. An operating unit (such as a push scan button) may further be provided for starting scanning by causing the scanner to perform a reading operation. The instructions to the scanner may be issued through the Ethernet (registered trademark) controller 17 from a PC, for example. A display portion 14 notifies or displays various kinds of information to a user and includes an LCD, an LED and so on. The information to be notified or displayed to a user may include the state of the scanner (such as a scanning state and an idle state) and a screen associated with an operation on the operation portion 15, for example.

Figure 2:
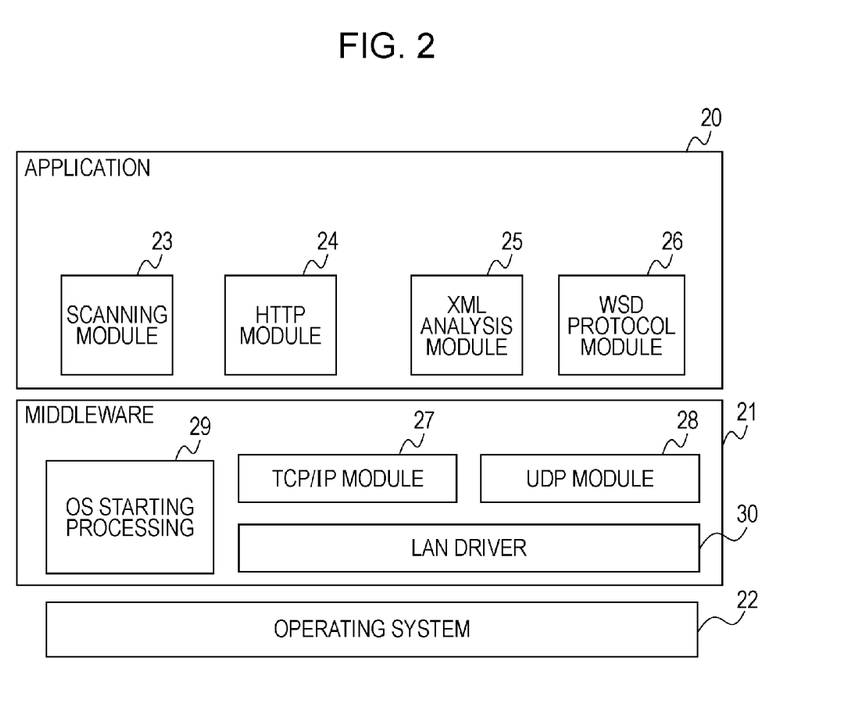
FIG. 2 is a schematic diagram of a software configuration of the scanner.

FIG. 2 illustrates a module configuration of programs stored in the ROM 12 in the network scanner according to an embodiment of the present invention illustrated in FIG. 1. The programs may be divided into an application layer 20, a middleware layer 21, and an operating system 22 for the scanner.

When the operating system 22 is first started, an OS starting processing 29 in the middleware layer 21 is called at the same time. The OS starting processing sequentially starts the required module or modules in accordance with the starting state of the scanner. The middleware layer 21 between the modules of the operating system 22 and application layer 20 performs communication control. A LAN driver 30, a TCP/IP module 27 and a UDP module 28 in the middleware layer 21 control the Ethernet (registered trademark) controller 17 so as to implement communication through TCP/IP or UDP. The application layer 20 includes a scanning module 23, an HTTP module 24, an XML analysis module 25, and a WSD protocol module 26. In general, the network setting including an IP address of the scanner, for example, may be performed not only through the operation portion 15 but also by starting a web browser of a client PC over the network and accessing the scanner. The HTTP module 24 may be used for both purposes of management as a web server for setting and HTTP communication defined in WSD. The XML analysis module 25 is used in communication with WSD, and may be used for analysis on data received using SOAP-over-UDP.

There will be described a scanning method with WSD scan service, below. First, regarding push scan defined in WSD scan service, a scan method in the past will be described.

Then, there will be described a method for performing push scan with a scan parameter specified by a user.

[Push Scan in the Past]

First of all, with reference to FIG. 3, there will be described push scan in the past in WSD scan service.

Figure 3:
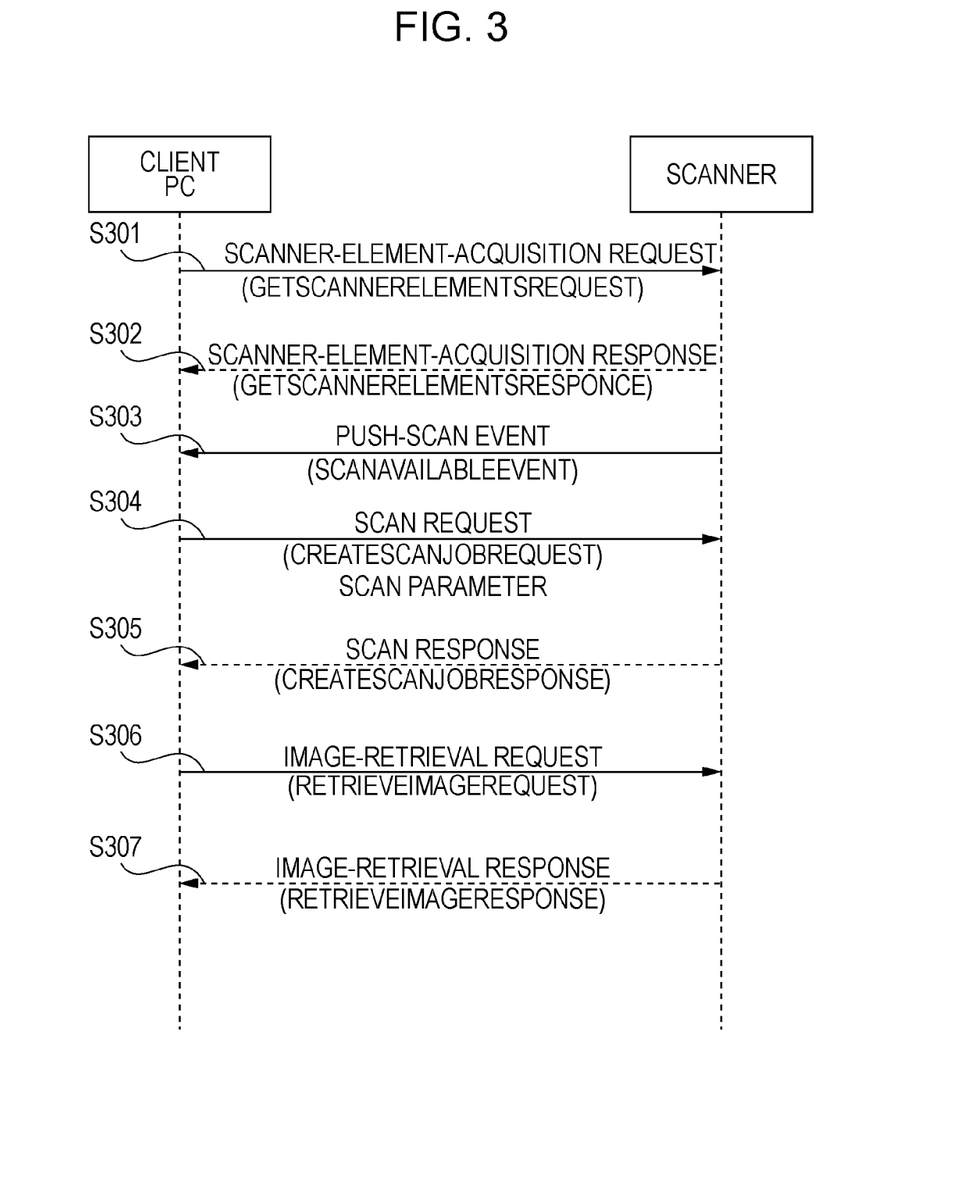
FIG. 3 illustrates a schematic sequence of push scan in the past.

FIG. 3 illustrates a schematic sequence of push scan in the past. Before using the scan service, a client PC transmits in advance to the scanner a command of a scanner-element-acquisition request for acquiring first information on the ability that the scanner originally has (step S301). The scanner-element-acquisition request command (GetScannerElementsRequest) is issued when the client PC installs the scanner or the client PC and the scanner are enabled to communicate over a network.

If the scanner receives the scanner-element-acquisition request command from the client PC, the scanner generates the first information on the ability of image processing that the scanner itself originally has.

The ability of image processing may include, for example, the state of the scanner and scanning performance specifications such as an output resolution, document type and reading range of the scanner. The first information is generated as a scanner-element-acquisition response command (GetScannerElementsResponse) by using a predetermined language supporting WSD and is transmitted to the client PC (step S302).

If the client PC receives the response command, the client PC can identify the performance of the scan service that can be provided by the scanner. The scan service information is saved and held in a holding unit such as a memory or an HDD, for example, present in the client PC.

A user may go to the image processing apparatus (or scanner) and mount A4-sized paper, for example, as a scanning target on a copy holder. Then, the user may operate the operation portion 15 on the image processing apparatus and depress a button for implementing push scan. The depression of the button causes the scanner to transmit a push scan event (ScanAvailableEvent) to the client PC (step S303). The transmission of the push scan event corresponds to the transmission of an event request command for requesting an event start command that is an instruction to start scanning.

The client PC having received the push-scan event in step S303, issues a scan request command (CreateScanJobRequest) to the scanner. The issuance of the scan request command corresponds to the transmission of the event start command that is an instruction to start scanning (step S304). This command by the client PC instructs to start scanning by using the scan parameter selected arbitrarily within the range of the scanning performance specifications of the scanner described in the first information held in the holding unit in step S302.

The scanner having received the scan request in step S304 determines whether the scanning based on the scan parameter contained in the scan request command is possible or not and whether the scanner has a state that the scanning can start or not. If the scanning is possible, the scanner returns a scan response command (CreateScanJobResponse). At that time, the reading device 16 may start the scanning, for example. If the scanning is not possible, a FAULT response is returned (step S305).

The client PC received the scan response command in step S305 issues an image-retrieval request command (RetrieveImageRequest) to the scanner (step S306).

The scanner having received the image-retrieval request in step S306 returns image-retrieval response command (RetrieveImageResponse) to the client PC and transmits the image data (step S307).

[Push Scan Applying the Present Invention]

Next, with reference to FIG. 4 to FIG. 8, there will be described a method for performing push scan with a scan parameter specified by a user in WSD scan service.

As described above, push scan in the past in WSD scan service implements scanning in accordance with the scan parameter contained in the scan request command issued by the client PC. Since push scan starts scanning in response to an operation from the scanner side, it is difficult for a user to select a desirable scan parameter from an application on a client PC, unlike pull scan.

Since it is difficult to notify the scan parameter to a client PC with the push-scan event, it is difficult also for the scanner side to select the scan parameter specified by a user (or it is difficult to reflect the scan request command even if selected).

In other words, it is difficult for push scan in the past in WSD scan service to scan with a user-specified scan parameter.

Accordingly, in push scan applying the present invention, a scanner-element changing event is used to perform push scan with a user-specified scan parameter, as follows:

The scanner-element changing event is an event to be used in WSD scan service and is used upon change in the ability that is acquired in step S301 in FIG. 3 of the scanner.

For example, in the past, an optional unit enabling two-sided scanning may be additionally mounted to a scanner. At that time, the scanner-element changing event is issued. The scanner-element changing event reflects the change in the ability of the scanner from one-sided scanning to two-sided scanning to the service description information held in the client PC to update.

The scan parameter set on the scanner by a user before the transmission of the push-scan event is used to generate the scanner-element changing event that is second information. The transmission of the generated scanner-element changing event to the client PC rewrites the service description information held in the client PC. This allows the scan request command from the client PC to limit the scan parameter to be arbitrarily specified to the scan parameter set by a user.

Push scan applying the present invention allows a client PC to identify that the scanning performance of the scanner is limited to that of the scan parameter specified by a user only. This can implement push scan with a user-specified scan parameter.

Figure 4:
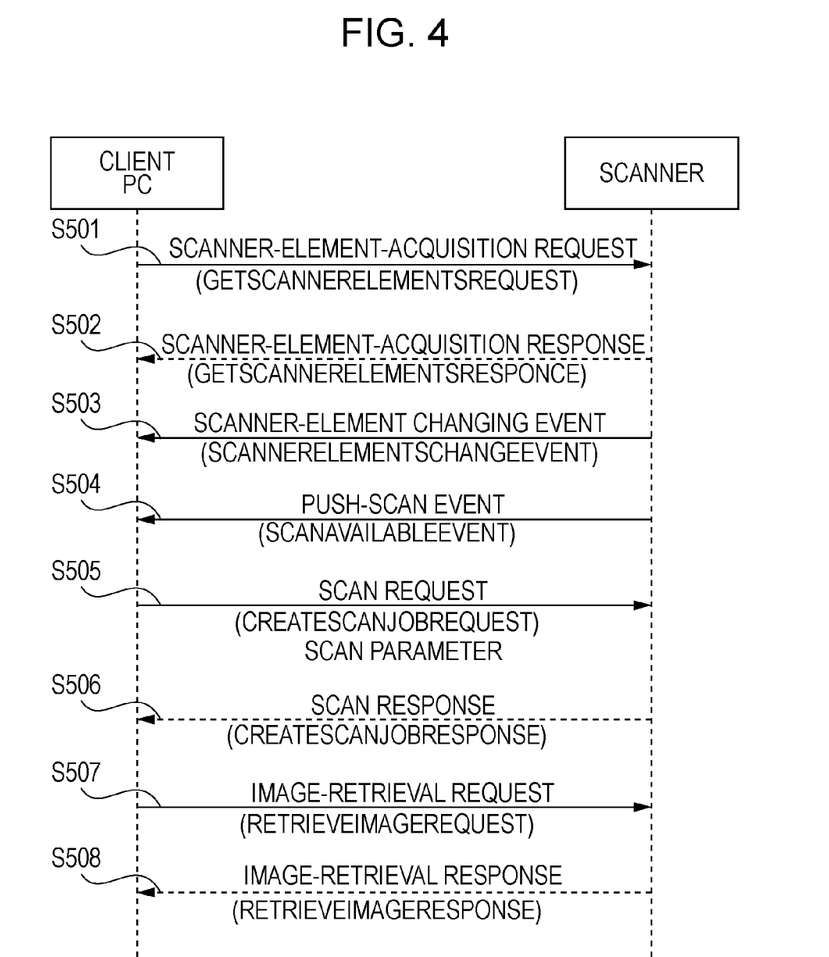
FIG. 4 illustrates a schematic sequence of push scan applying the present invention.

FIG. 4 illustrates a schematic sequence of push scan applying the present invention. Since the same operations are performed in steps S501 to S502 as those in steps S301 to S302 described with reference to FIG. 3, the description will be omitted.

A user may go to the scanner and mount A4-sized paper, for example, as a scanning target on a copy holder. Then, the user may select a desirable scan parameter on the scanner and depress a scan start button. The depression of the scan start button causes the scanner to generate a scanner-element changing event that is second information and transmit it to a client PC by using a second transmitting unit (step S503) in order to reflect the scan parameter selected by the user to the scan request command.

The event notification in step S503 causes the scanner to notify the change in the scan ability as if the scanner's ability is limited to the one with the scan parameter selected by the user only to the client PC that is the destination of the push scan.

Then, the client PC that is the push scan destination specified by the user only identifies the fact that there has been a change in the scanner's scanning performance (or the value or range of the scan parameter to be supported) and updates the value of the scanning performance held in a storage area.

Since the notification of the change in scanner's performance is not transmitted to the other client PCs connected to the network, the scanner's performance is not changed to the one with the scan parameter selected by the user.

Next, an event request command, that is, push-scan event (ScanAvailableEvent) that is a request for a scan request is issued to the client PC that is the push scan destination (step S504).

The client PC having received the push-scan event in step S504 issues a scan request command (CreateScanJobRequest) as an event start command instructing to start image processing (step S505).

The command contains the scan parameter arbitrarily selected by the client PC within the range of the scanning performance specifications. Thus, the scan parameter contained in the scan request command is the value of the scan parameter specified by the user as the second information representing the value or range to be supported by the scanner and having been updated by the scanner-element changing event previously transmitted to the client PC.

The scanner having received the scan request command in step S505 determines whether the scanning is possible in accordance with the scan parameter contained in the scan request command or not and whether the scanner is ready to start the scanning or not. If the scanning is possible, the scanner returns a scan response command (CreateScanJobResponse).

The reading device 16 may start the scanning at that time, for example. If the scanning is not possible, the scanner returns a FAULT response (step S506).

The client PC having received the scan response command in step S506 issues an image-retrieval request command (RetrieveImageRequest) to the scanner (step S507).

The scanner having received the image-retrieval request in step S507 returns an image-retrieval response command (RetrieveImageResponse) and transmits the read image data to the client PC (step S508).

Figure 5:
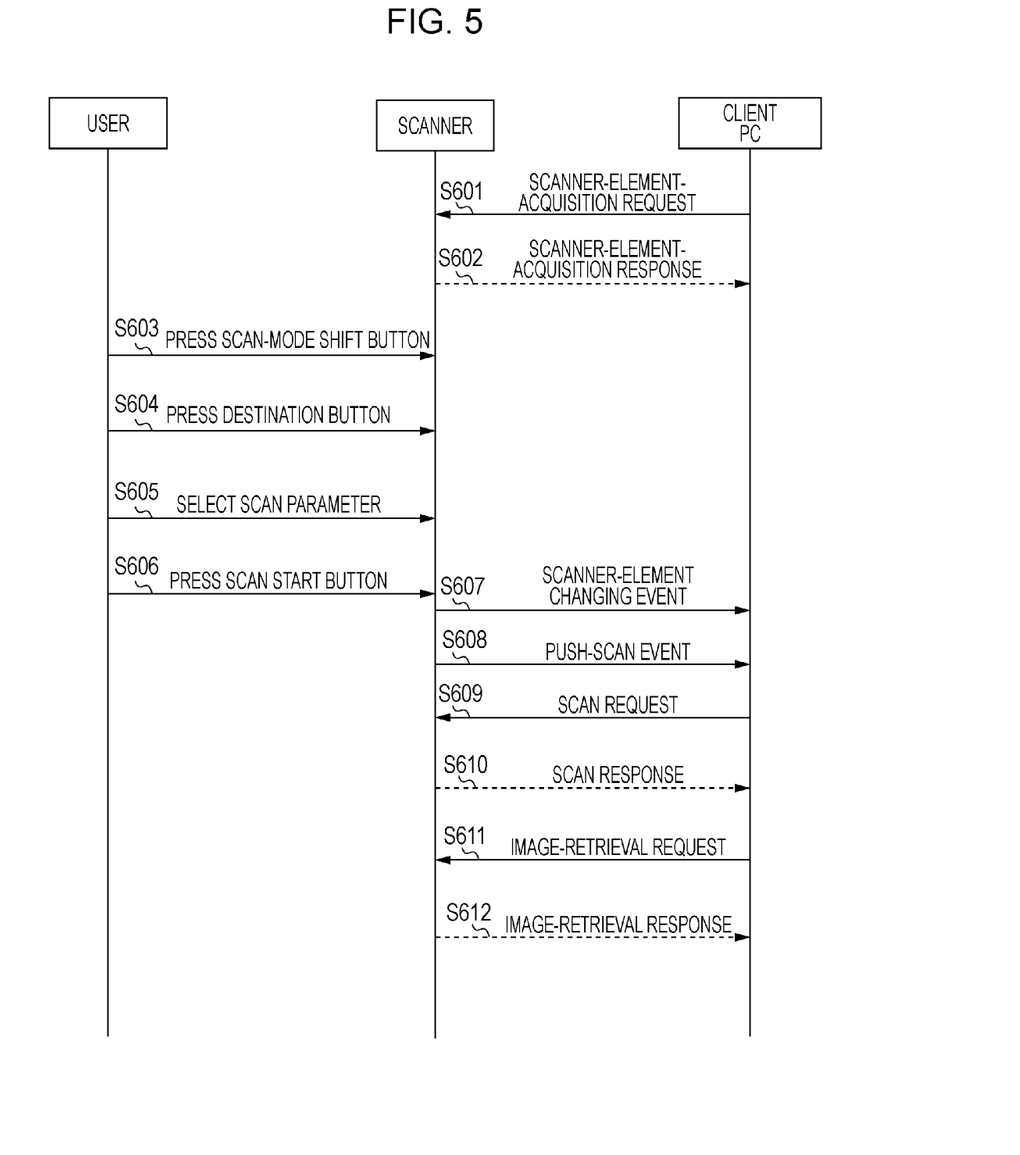
FIG. 5 illustrates a basic sequence of push scan applying the present invention.

Operations by the scanner in push scan applying the present invention will be described in detail by using actual command names with reference to the basic sequence in FIG. 5. According to this embodiment, three PCs of the PC 1, PC 2, and PC 3 are connected to the scanner, and the scanner has already installed in each of the PCs. The PC 1 is handled as a client PC in the following embodiment.

The scanner has scanning performance allowing the scanning with the following scan parameters:

Resolutions: (1) 150 dpi and (2) 300 dpi.
Document Types: (1) TEXT and (2) PHOTO.

(Though, according to this embodiment, there are provided two parameters of resolutions and document types, all the other parameters that can be set on the scanner side are applicable in reality.)

First of all, when network communication is established between the client PC and the scanner, the client PC issues a scanner-element-acquisition request command (step S601). Here, the scanner reads from the ROM 12 the scan parameters (resolutions: (1) 150 dpi and (2) 300 dpi and document types: (1) TEXT and (2) PHOTO) supported by itself and generates and returns a scanner-element-acquisition response command by including the read scan parameters into the command (step S602).

The PC 2 and PC 3 also issue the scanner-element-acquisition request command and acquire the scanning performance of the scanner. At that time, the PCs 1 to 3 are identifying that the scanner supports the resolutions 150 dpi and 300 dpi and the document types TEXT and PHOTO.

Here, in order to implement push scan, a user may operate the operation portion 15 and depress a scan shift button by watching the screen displayed on the display portion 14 of the scanner (step S603).

Figure 6A:
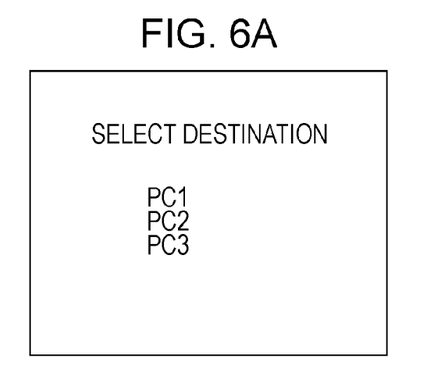
FIGS. 6A to 6C illustrate selection screens for parameters to be displayed on a display portion.
Figure 6B:
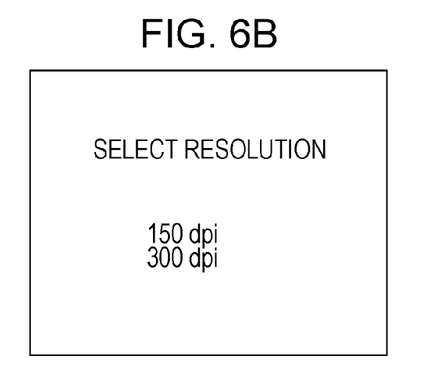

When the user operation causes the scanner to shift to a push scan mode, a push-scan destination selection screen is displayed on the display portion 14. The push-scan destination selection screen displays the PC 1, PC 2 and PC 3 (FIG. 6A).

Here, it is assumed that the user selects the PC 1 (client PC) as the destination (step S604).

Figure 6C:
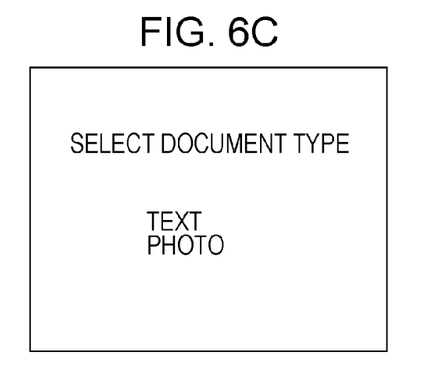

If the PC 1 (client PC) is selected, a scan parameter selection screen is then displayed on the display portion 14. The scan parameter selection screen displays selectable scan parameters of the resolutions (150 dpi and 300 dpi) (FIG. 6B) and document types (TEXT and PHOTO) (FIG. 6C).

It is assumed here that the user operation selects the resolution: 300 dpi (common in width and height) and the document type: TEXT (step S605). At that time, the scan parameters (resolution: 300 dpi and document type: TEXT) selected by the user are temporarily saved in the RAM 13.

If the user depresses a scan start button (step S606), the scanner first reads the scan parameters temporarily saved in the RAM 13 and generates and notifies a scanner-element changing event including the read parameters to the PC 1 (client PC) (step S607). Then, the scanner notifies a push-scan event that is a request for the scan request to the client PC (step S608).

The scanner-element changing event in step S607 is only notified to the PC 1 (client PC) that is the push scan destination.

The event contains the description 'The resolution 300 dpi is only supported, and the document type TEXT is only supported' in a language based on the WSD format.

The PC 1(client PC) having received the event identifies that the scanner is a device only supporting the resolution 300 dpi and the document type TEXT.

In other words, the PC 1 (client PC) is identifying from the scanner-element changing event that the limited scanning performance that is different from the original scanning performance (including the supported scan parameter values and/or range) as the scanning performance of the scanner.

On the other hand, the PC 2 and PC 3 are still identifying that the scanner supports the resolutions 150 dpi and 300 dpi and the document types TEXT and PHOTO.

The PC 1 (client PC) having received the push-scan event issues a scan request command that instructs to start the image processing (step S609). The scan parameter specified by the scan request command is arbitrarily selected from the values or range of the scan parameters supported by the scanner.

As described above, the PC 1 (client PC) is identifying from the scanner-element changing event received in step S607 that the present scanner is only supporting the resolution 300 dpi and the document type TEXT. Thus, the scan request command contains the scan parameters specified as the resolution: 300 dpi and document type: TEXT.

The scanner having received the scan request command determines whether the scanning with the requested scan parameters is possible or not and further determines whether the scanner is ready for the scanning operation or not.

If it is determined that the scanning is possible, the scanner returns the scan response command (OK response) and starts the scanning by the reading device 16 with the specified scan parameters. If it is determined that the scanning is not possible, the scanner returns a FAULT response (or NG response) (step S610).

If the PC 1 (client PC) receives the scan response command (or OK response) in response to the scan request command, the PC 1 then issues an image-retrieval request command (step S611) to request the scanned image data to the scanner. If the PC 1 receives the FAULT response (or NG response) in response to the scan request command, the PC 1 aborts the subsequent processing. The scanning is not performed.

The scanner having received the image-retrieval request command transmits the image data generated by the reading device 16 sequentially to the PC 1 (client PC) (step S612).

While, according to this embodiment, the image data are sequentially transmitted, the image data for one page may be generated when the scan request or image-retrieval request is received, and the image data may be collectively transmitted to the PC 1 (client PC). The image-data transmission method is not particularly limited. The PC 1 (client PC) having received the image data stores the image data in a storage area in an HDD, for example.

As described above, according to the present invention, the client PC is notified through WSD scan service that the performance of the scanner is limited by the scan parameters specified by a user. This only allows the client PC side to issue a scan request command with the scan parameters specified by a user and allows push scan with the scan parameters specified by the user.

Moreover, since the scanner-element changing event is not transmitted to the client PCs (such as the PC 2 and PC 3 here) that are not the push scan destination, the scan request commands from the client PCs excluding the push scan destination are not affected by the scan parameters specified by a user.

Having described that, according to this embodiment, the scan parameters that can be specified by a user are limited to the resolution and document type only, the present invention is not limited thereto. All of the scan parameters defined in WSD scan service may be available for the specification. Moreover, the scan parameters that are not defined may be available for the specification.

All or a part of the values of the scan parameters specified by a user in the scanner-element changing event may be notified.

In scanning using WSD scan service, the client PC may specify all of the scan parameters defined in WSD scan service to the device or only specify a part of them. For example, the sharpness (or edge enhancement), the compression quality factor (or the degree of compression for generating an image in a compressed image format such as a JPEG image) or the like may not be specified.

In that case, the notification of all of the scan parameters specified by a user may not be required. For example, when it is known in advance that the parameter regarding sharpness is not specified by a client PC, the notification to the client PC with scanner-element changing event may not be required.

In this way, the notification of parameters only can further advantageously reduce the network traffic.

During push scan processing, the reception of other jobs (the scan request commands excluding the scan request command in push scan that is transmitted by the push-scan destination client PC) may be inhibited. In this case, a FAULT response may be returned to the scan request commands to inhibit the reception of other jobs. Alternatively, user's operations on the operation portion of the scanner may be denied to inhibit continuous push scan.

The exclusion for denying other jobs may be performed when the scanner-element changing event is transmitted or when the push-scan event is transmitted. Alternatively, it may be performed when the scan response command is transmitted or the scanning is started.

After the scanner-element changing event is transmitted, the scanner-element-acquisition request command from the same destination client PC may be responded by the scanning performance reflecting the scan parameter previously specified by the user and read from the RAM 13.

Thus, a user who uses the client PC and performs the push scan operation with the same parameters all the time may not be required to set the scan parameters every time. This can improve the operability.

A user may specify and set a scan parameter not only through the operation portion 15 of the scanner but also by starting a web browser of the client PC over a network and accessing the scanner. Also in this case, the scan parameter set on the web browser may be saved in the RAM 13 and be notified to the client PC through the aforementioned operation.

The image processing apparatus may transmit image data to the client PC and at the same time transmit and output the image data to an output device (such as a printer) included in the image processing apparatus or a network printer that is connected to a network and specified in advance by a user.

Thus, image data can be stored in the client PC, and at the same time the output result can also be acquired.

This can eliminate the necessity for a user to perform the complicated steps of moving from the image processing apparatus to the client PC, instructing the image processing apparatus (or a network printer) to output the image data saved in the client PC and going to the image processing apparatus (or network printer) to get the output result and thus can improve operability.

Second Embodiment

According to the first embodiment, the scanner-element changing event reflecting the scan parameters specified by a user is transmitted before the transmission of the push-scan event. Thus, the scanning ability held in a holding unit in the client PC can be updated with the scan parameters specified by a user to allow push scan.

However, after the end of the push scan processing, the client PC that is the push-scan destination client PC may transmit a scan request command for pull scan.

In this case, the client PC is identifying from the scanner-element changing event in the previous push scan the limited scanning performance (only supporting a user-specified value) that is different from the original scanning performance (including the supported scan parameter values and/or range) as the scanning performance of the scanner.

In this case, to a user trying to implement scanning from an application in the client PC, for example, a resolution of 300 dpi is only available though the resolutions 150 dpi and 300 dpi are originally available. In other words, in pull scan after the end of push scan, there may be a possibility that only limited scan parameters are available to the client PC.

According to the second embodiment, after the scanner-element changing event reflecting the scan parameters specified by a user is transmitted to the client PC that is the push-scan destination and push scan is performed with the limited scanning performance (or with the supported scan parameter values or range), a second scanner-element changing event is transmitted. This eliminates the limitation on scanning performance.

Since the second embodiment has the same hardware requirements and software requirements as those of the first embodiment, the description will be omitted (or refer to FIG. 1 and FIG. 2), and the points different from the first embodiment will only be described.

Figure 7:
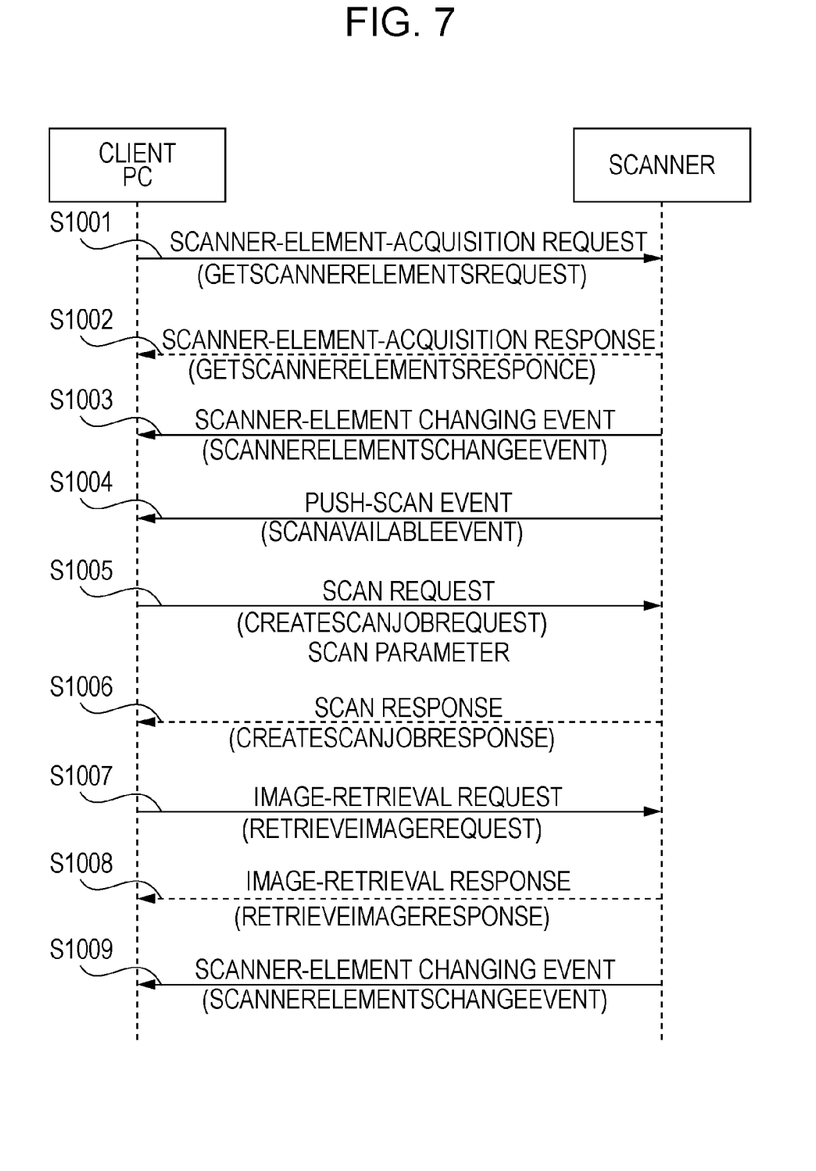
FIG. 7 illustrates a schematic sequence of push scan applying the present invention.

FIG. 7 illustrates a schematic sequence of push scan applying the present invention according to the second embodiment. Since the sequence in step S1001 to step S1008 is the same as that in step S501 to step S508 in FIG. 4, the description will be omitted.

After the scanning by the reading device 16 ends and the image data is transferred in step S1008, a second scanner-element changing event containing the same information generated as the first information is only transmitted to the client PC (step S1009). Thus, the scanning performance being identified by the client PC can be changed from the limited scanning performance to the original scanning performance.

Figure 8:
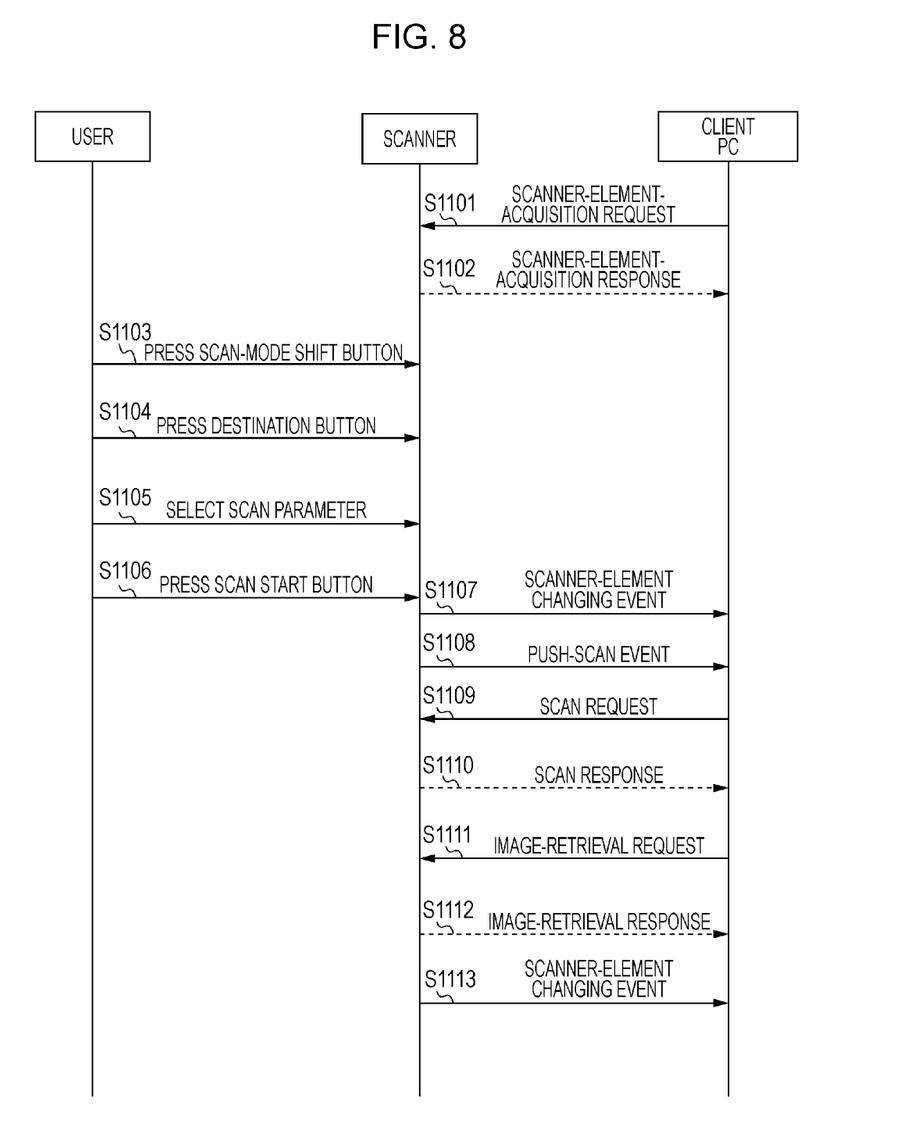
FIG. 8 illustrates a basic sequence of push scan applying the present invention.

The operation by the scanner in push scan applying the present invention according to the second embodiment will be described in detail with reference to the basic sequence in FIG. 8. Since the sequence in step S1101 to step S1112 is the same as that in step S601 to step S612 in FIG. 5, the description will be omitted.

After the scan by the reading device 16 ends and the image data is transferred in step S1112, the scanning performance is limited (only supporting a user-specified value in push scan) that is different from the original scanning performance being identified by the client PC.

In order to eliminate the limitation, the second scanner-element changing event is only transmitted to the client PC (step S1113). At that time, the scanner reads the original scan parameters held in the ROM 12 and includes the read parameters in the scanner-element changing event.

Thus, the second scanner-element changing event contains the first information including the description 'The resolutions 150 dpi and 300 dpi are supported, and the document types TEXT and PHOTO are supported' in a language based on the WSD format.

The client PC having received the scanner-element changing event is identifying that the scanner is supporting the resolutions 150 dpi and 300 dpi and the document types TEXT and PHOTO.

In other words, through the reception of the second scanner-element changing event, the scanning performance held in a holding unit is updated, and the client PC is identifying the original scanning performance as the scanning performance of the scanner.

As a result, after step S1113 and in pull scan after the end of the push scan, the limitation can be removed from the scan parameters that can be specified by the client PC.

As described above, according to this embodiment, after the scanner-element changing event reflecting the scan parameters specified by a user is transmitted to the push-scan destination client PC and the push scan is performed with limited scanning performance, the second scanner-element changing event is transmitted.

Thus, in pull scan after the end of the push scan, the limitation can be removed from the scan parameters that can be specified by the client PC.

Having described that, according to this embodiment, the second scanner-element changing event is issued after the end of the scanning (or after the transfer of the image data), the timing is not limited thereto if it is after the first scanner-element changing event. It may be after the transmission of the scan response command or after the FAULT response to the scan request command.

In this way, in push scan applying the present invention according to the first and second embodiments, push scan with user-specified scan parameters can be implemented without extending the WSD scan service specifications.

Having described that, according to the first and second embodiments, the image data read by the scanner is transmitted to the client PC having issued the scan request, the destination of the data after the push scan is not limited thereto.

The image data may be transmitted to other apparatus if the image data does not require image processing within the client PC or saving in the client PC. For example, the image data may be transmitted to a printer connected to the client PC or a printer preset over a network or, if the scanner is contained in multifunctional peripherals, the image data may be transmitted to a printer among the peripherals, for printing.

Moreover, the destination of the scanned data is not limited to a printer but may be a facsimile or a storage area over a network or among peripherals.

In this case, in addition to the destination selection screen for PCs in FIG. 6A, screens for selecting a data destination and/or image processing are desirably provided.

The objects of the present invention may be achieved by supplying a recording medium recording a control program that controls an image processing system with the software implementing the functions of the aforementioned embodiments to a system or an apparatus and causing a computer (or a CPU or an MPU) in the system or apparatus to read and execute the program code stored in the recording medium.

In this case, the program code itself read from the recording medium implements the functions of the aforementioned embodiments. The recording medium recording the program code is included in the present invention.

The recording medium for supplying the program code may be, for example, a flexible disk, a hard disk, an optical disk, a magnet-optical disk, a CD-ROM, a CD-R, a magnetic tape, a non-volatile memory card, a ROM, a DVD or the like.

Instead of the execution of the program code read by a computer, the functions of the aforementioned embodiments may be implemented by a part or all of the actual processing performed by an operating system (OS) or the like operating in the computer on the basis of the instructions from the program code.

The program code read from the recording medium may be written to a memory included in a feature expansion board inserted to the computer or a function expansion unit connected to the computer. After that, the functions of the aforementioned embodiments may be implemented by a part or all of the actual processing performed by a CPU included in the feature expansion board or function expansion unit on the basis of the instructions from the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A reading apparatus comprising:
a notification unit which notifies a reading control apparatus connected with the reading apparatus of a reading request which is instructed by a user of the reading apparatus and a selected reading parameter which is selected by the user on the reading apparatus except for a non-selected reading parameter which is not selected by the user on the reading apparatus as an ability of the reading apparatus;
a receiving unit which receives a reading start request with the selected reading parameter notified by the notification unit as a response to the reading request notified by the notification unit; and
a reading unit which reads an image of a document based on the selected reading parameter received by the receiving unit in accordance with the reading start request received by the receiving unit,
wherein the notification unit notifies, after the reading unit completes reading by the selected reading parameter received by the receiving unit, the reading control apparatus of the selected reading parameter and the non-selected reading parameter as the ability of the reading apparatus.

2. The reading apparatus according to claim 1, wherein the notification unit notifies the selected reading parameter as information indicating that the ability of the reading apparatus is updated, the updated ability corresponding to the reading parameter set by the user on the reading apparatus.

3. The reading apparatus according to claim 2, wherein the notification unit notifies, when the reading unit completes a reading by the selected reading parameter received by the receiving unit, the reading control apparatus of a prior ability of the reading apparatus.

4. The reading apparatus according to claim 1, further comprising a selecting unit which selects a notification destination of the notification unit, wherein the notification unit notifies the reading control apparatus selected as the notification destination by selecting unit of the selected reading parameter.

5. The reading apparatus according to claim 1, wherein the notification unit notifies the reading control apparatus of the reading request and the selected reading parameter under a WSD (Web Services for Devices) protocol, and the receiving unit receives the reading start request under the WSD protocol.

6. An image reading method between a reading apparatus for reading an image of a document and a reading control apparatus connected with the reading apparatus, the method comprising:

in the reading apparatus:
notifying the reading control apparatus of a reading request which is instructed by a user of the reading apparatus and a selected reading parameter which is set by the user on the reading apparatus except for a non-selected reading parameter which is not selected by the user on the reading apparatus as an ability of the reading apparatus;
in the reading control apparatus:
acquiring the notified reading request and the reading parameter; and
transmitting a reading start request with the acquired reading parameter to the reading apparatus;
in the reading apparatus:
receiving the transmitted reading start request with the reading parameter as a response to the notified reading request;
reading an image of a document based on the received reading parameter in accordance with the received reading start request; and
notifying, after the reading by the selected reading parameter is completed, the reading control apparatus of the selected reading parameter and the non-selected reading parameter as the ability of the reading apparatus.

7. The method according to claim 6, wherein, in the notifying of the selected reading parameter, information indicating that the ability of the reading apparatus is updated is notified, the updated ability corresponding to the reading parameter set by the user on the reading apparatus.

8. The method according to claim 7, wherein, in the notifying of the selected reading parameter and the non-selected reading parameter, a prior ability of the reading apparatus is notified when the reading by the selected reading parameter is completed.

9. The method according to claim 6, further comprising selecting a notification destination for notifying the selected reading parameter in the reading apparatus.

10. The method according to claim 6, wherein the reading request and the selected reading parameter is notified under a WSD (Web Services for Devices) protocol, and the reading start request is received under the WSD protocol.

11. A non-transitory computer-readable storage medium storing computer-executable program for performing a control method for a reading apparatus, the control method comprising:
notifying a reading control apparatus connected with the reading apparatus of a reading request which is instructed by a user of the reading apparatus and a selected reading parameter which is selected by the user on the reading apparatus except for a non-selected reading parameter which is not selected by the user on the reading apparatus as an ability of the reading apparatus;
receiving a reading start request with the selected reading parameter as a response to the notified reading request;
causing the reading apparatus to read an image of a document based on the selected reading parameter in accordance with the received reading start request; and
notifying, after the reading by the selected reading parameter is completed, the reading control apparatus of the selected reading parameter and the non-selected reading parameter as the ability of the reading apparatus.

12. The storage medium according to claim 11, wherein, in the notifying of the selected reading parameter, information indicating that the ability of the reading apparatus is updated is notified, the updated ability corresponding to the reading parameter set by the user on the reading apparatus.

13. The storage medium according to claim 12, wherein, in the notifying of the selected reading parameter and the non-selected reading parameter, a prior ability of the reading apparatus is notified when the reading by the selected reading parameter is completed.

14. The storage medium according to claim 11, the control method further comprising selecting a notification destination for notifying the selected reading parameter in the reading apparatus.

15. The storage medium according to claim 11, wherein the reading request and the selected reading parameter is notified under a WSD (Web Services for Devices) protocol, and the reading start request is received under the WSD protocol.

* * * * *